United States Patent
Kobata et al.

(10) Patent No.: US 6,591,367 B1
(45) Date of Patent: Jul. 8, 2003

(54) METHOD AND APPARATUS FOR PREVENTING UNAUTHORIZED COPYING AND DISTRIBUTING OF ELECTRONIC MESSAGES TRANSMITTED OVER A NETWORK

(75) Inventors: Hiroshi Kobata, Brookline, MA (US); Robert Gagne, Boston, MA (US)

(73) Assignee: Atabok Japan, Inc., Newton, MA (US)

( * ) Notice: Subject to any disclaimer, the term of this patent is extended or adjusted under 35 U.S.C. 154(b) by 0 days.

(21) Appl. No.: 09/281,894

(22) Filed: Mar. 31, 1999

(51) Int. Cl.$^7$ ................................................ H04L 9/00
(52) U.S. Cl. .................... 713/201; 713/200; 713/176; 713/193; 380/46; 705/52; 705/51
(58) Field of Search ............................ 380/46; 705/52, 705/51; 713/201, 176, 193

(56) References Cited

U.S. PATENT DOCUMENTS

| | | | |
|---|---|---|---|
| 4,924,378 A | | 5/1990 | Hershey et al. |
| 5,341,429 A | * | 8/1994 | Stringer et al. ............... 705/52 |
| 5,412,718 A | * | 5/1995 | Narasimhalu et al. ......... 380/46 |

FOREIGN PATENT DOCUMENTS

| | | |
|---|---|---|
| EP | 0778512 A2 | 6/1997 |
| EP | 0844550 A2 | 5/1998 |
| EP | 0881561 A2 | 12/1998 |
| EP | 0895149 A1 | 2/1999 |
| GB | 2305339 A | 4/1997 |
| WO | WO 90/13865 | 11/1990 |
| WO | WO 98/45768 | 10/1998 |
| WO | WO 98/52114 | 11/1998 |

OTHER PUBLICATIONS

Abhijit K. Choudhury et al., "Copyright Protection for Electronic Publishing over Computer Networks," IEEE Network: The Magazine of Computer Communications, US, IEEE Inc., New York, vol. 9, No. 3, May 1, 1995.

* cited by examiner

*Primary Examiner*—Ly V. Hua
(74) *Attorney, Agent, or Firm*—Fish & Richardson P.C.

(57) ABSTRACT

A method and apparatus for providing protection from unauthorized use of messages received by a system is described. The receiving system can receive a message from a sending system, for example, over a network or from local media. The message can be an e-mail message, the contents of a Web page, music, or software, etc. The receiving system stores the digital information in a storage device in a manner designed to conceal the message from unauthorized access. When a user of the receiving system wants to view the message, the digital information is accessed, the message is generated from the digital information and displayed at the receiving system. Use of this generated message is restricted. In another embodiment, this use is limited to outputting (i.e., displaying and producing sound) the generated message at the receiving system. The receiving system cannot copy, modify, save, forward, or capture any portion of the generated message. In another embodiment, restrictions on the use of the generated message are relaxed to allow printing a copy of the generated message.

24 Claims, 5 Drawing Sheets

METHOD AND APPARATUS FOR PREVENTING UNAUTHORIZED COPYING AND DISTRIBUTING OF ELECTRONIC MESSAGES TRANSMITTED OVER A NETWORK

FIELD OF THE INVENTION

The invention relates generally to a method and apparatus for transmitting digital information over a network. More specifically, the invention relates to a method and apparatus for protecting such transmitted information from unauthorized replication, publication, and distribution.

BACKGROUND

The Internet is an international collection of interconnected networks currently providing connectivity among millions of computer systems. One popular form of network communication among Internet users is electronic mail (e-mail). E-mail is a "store and forward" service that enables sending computer systems to electronically exchange text messages and computer files with receiving computer systems across the globe. The text messages pass over the Internet from computer system to computer system to arrive at their destination. Often computer files accompany the text messages on the journey as attachments.

Attachments when opened can produce a variety of outputs. For example, an output can be the display of a formatted document, execution of a software program, the playing of music or other sounds, or the display of static and animated graphical images. Many e-mail systems, however, typically limit the size of e-mail messages, and attachments are either smaller than this limit or are broken into smaller files and reconstructed by the receiver. Consequently, electronic document delivery systems have emerged as another popular store-and-forward service, to handle the delivery of large files across the network.

Another increasingly popular avenue for exchanging information among computer systems is the World Wide Web ("Web"). The Web is a part of the Internet that provides a graphics and sound-oriented technology used by computer systems to access a vast variety of digital information, e.g., files, documents, images, and sounds, stored on other computer systems, called "Web sites." A Web site consists of electronic pages or documents called "Web pages." Often a Web page has links, called hyperlinks, to files and documents at other Web pages on the Web.

Computer system users can obtain digital information from these Web sites through a graphical user interface produced by executing client software called a "browser." Examples of commercially available Web browsers include Netscape Navigator™ and Microsoft Internet Explorer™. Web browsers use a variety of standardized methods (i.e., protocols) for addressing and communicating with Web sites. A common protocol for publishing and viewing linked text documents is HyperText Transfer Protocol (HTTP).

To access a Web page at a Web site, a computer system user enters the address of the Web page, called an Uniform Resource Locator (URL), in an address box provided by the Web browser. The URL can specify the location of a Web server or a file on a Web server. Accessing the Web page downloads the contents of that Web page to the requesting computer system. The result of such downloading can be an wide variety of outputs at the computer system, including any combination of text, graphics, audio, and video information (e.g., images, motion pictures, animation, etc.). Accessing the Web page can also invoke execution of an application program.

A consequence of transmitting information using these above-described techniques, however, is that the sender of the information can lose control of that information after e-mailing the information to the receiving system or making a Web page publicly available on the Internet. Control of the information passes to the receiver, and any hope held by the sender to keep the information from further dissemination rests on the receiver. Most often, however, any such hope is misplaced, particularly on the Internet, where the receivers of the information can be numerous and anonymous. Thus, there is a need for a method and apparatus by which a sender can limit the unauthorized replication, publication, and distribution by a receiver of transmitted information.

SUMMARY

The invention features a method for providing protection from unauthorized use of messages by a system. In one aspect, the method includes receiving at the system digital information representing a message. The digital information is stored in a storage device in a manner designed to conceal the message from unauthorized access. The digital information is accessed, the message is generated from the digital information for output at the system, and use of the generated message is restricted. In one embodiment, use of the generated message is limited to outputting the generated message at the system and printing a copy of the generated message. In another embodiment, use of the generated message is limited to outputting the generated message at the system.

In another aspect, the invention features a computer system for providing protection from unauthorized use of digital information received over a network. The system includes a storage device and a processor storing the digital information in the storage device in a manner designed to conceal the message from unauthorized access. A message generator accesses the digital information stored in the storage device to generate the message from the stored digital information for output at the system. However, the message generator restricts use of the generated message. In one embodiment, the computer system includes an output device, and the message generator limits use of the generated message to outputting the generated message at the output device. In another embodiment, the message generator limits the use to outputting the generated message at the output device and at a printing device.

Concealing the message from unauthorized access can be achieved by encoding the digital information before the processor stores the digital information in the storage device, storing the digital information at randomly determined address locations of the storage device, or by other techniques known to one skilled in the art.

The computer system can also include a process monitor for monitoring the computer system for process changes that occur on the computer system while the message is being output at the output device. The process monitor terminates the outputting of the message at the system upon detecting a process change.

BRIEF DESCRIPTION OF THE DRAWINGS

The invention is pointed out with particularity in the appended claims. The above and further advantages of the invention may be better understood by referring to the following description in conjunction with the accompanying drawings, in which:

DETAILED DESCRIPTION OF THE INVENTION

Figure 1:
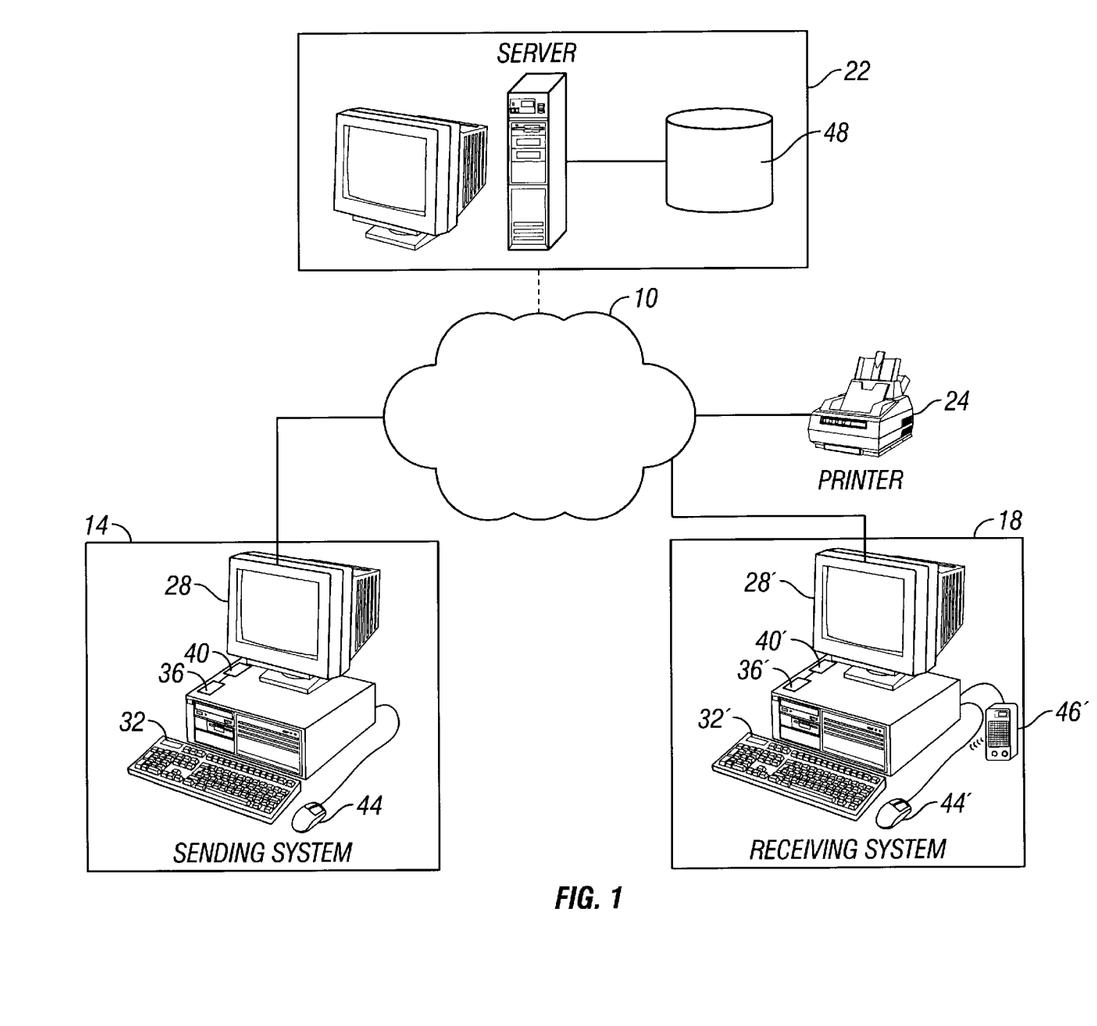
FIG. 1 is a diagram of an exemplary embodiment of a network including a sending system, a receiving system, and a server system.

FIG. 1 shows an exemplary embodiment of a network 10 including a sending computer system 14, a receiving computer system 18, a server system 22 and a printing device 24. Other sending systems, receiving systems, server systems, and peripheral devices such as, for example, a CD-ROM (compact disk read-only memory) writer, can be part of the network 10. The sending system 14 and server system 22 transmit digital information to the receiving system 18. The transmitted digital information can represent an unlimited variety of content, for example, text, files, documents, parcels, multimedia content, video data, images, electronic photographs, executable software, program source code, file folders, audio data, music, etc. During transmission, the digital information can have a compressed and/or encoded form. Hereafter such digital information is generally referred to as a message. According to the principles of the invention, messages received by the receiving system 18 can obtain protection from unauthorized publication, replication, and distribution. It is to be understood that the protection afforded according to such principles can be given to messages currently resident within the memory of the receiving system 18.

The network 10 can be, for example, a local-area network (LAN), an Intranet, or a wide area network (WAN) such as the Internet or the World Wide Web. Each of the sending, receiving, and server systems can connect to the network through a variety of connections including standard telephone lines, LAN or WAN links (e.g., T1, T3, 56 kb, X.25), broadband connections (ISDN, Frame Relay, ATM), and wireless connections. The connections can be established using a variety of communication protocols (e.g., HTTP, TCP/IP, IPX, SPX, NetBIOS, Ethernet, RS232, and direct asynchronous connections).

The sending and receiving systems 14, 18 can be any personal computer (e.g., 286, 386, 486, Pentium, Pentium II), thin-client device, Macintosh computer, Windows-based terminal, Network Computer, wireless device, information appliance, RISC Power PC, X-device, workstation, mini computer, main frame computer, or other computing device having a graphical user interface. Windows-oriented platforms supported by the sending and receiving systems 14, 18 can include Windows 3.x, Windows 95, Windows 98, Windows NT 3.51, Windows NT 4.0, Windows CE, Windows CE for windows-based terminals, Macintosh, Java, and Unix. The sending and receiving systems 14, 18 can include a display screen 28, 28', a keyboard 32, 32', memory 36, 36', a processor 40, 40', and a mouse 44, 44', respectively. The memory 36, 36' can provide persistent storage, such as a hard-drive device, or volatile storage, such as dynamic RAM. The receiving system 18 may also include a speaker 46'.

The server system 22 is any computer system, or group of computer systems acting logically as a single server system, capable of receiving and forwarding messages of any size and type from the sending system 14 to the receiving system 18. The server system 22 can also operate as a Web server, communicate according to the HTTP protocol, maintain Web pages, process URLs, and control access to other portions of the network 10 (e.g., workstations, storage systems, printers) or to other networks. Accordingly, the server system 22 can operate as a store-and-forward system, e.g., an e-mail server or an electronic document delivery system, or as a Web site providing Web pages to the receiving system 18 for downloading. The server system 22 includes a storage device 48 for storing messages before forwarding to the receiving system 18. The storage device 48 can provide persistent or volatile storage.

In one embodiment, the sending system 14 transmits a message to the receiving system 18 via the server system 22. The server system 22 stores the message (i.e., the digital information representing the message) in the storage device 48 and awaits a request from the receiving system 18 to obtain the message. The receiving system 18 can request the message by logging on to the server system 22 and selecting those messages of interest from the server system 22.

Typically, in response to logging on, the server system 22 presents the receiving system user with a list of each message available to the receiving system user. The receiving system user can select a particular message by double-clicking that message with the mouse 44'. The server system 22 then transmits the selected message to the receiving system 18 where the digital information of the message is stored and the message is output. An example of a messaging system that can practice the principles of the invention is described in the United States patent application "An Electronic Parcel Delivery System," by Kobata et al., filed on Feb. 26, 1999 and incorporated by reference herein.

In another embodiment, the receiving system 18 can access a Web page on the server system 22 through the browser and download the contents of that Web page (i.e., the message) from the server system 22. In both embodiments, receipt of the message triggers execution of application software installed on the receiving system 18 that implements message protection of the invention.

In still other embodiments, the receiving system 18 can obtain digital information from other media, such as for example, a diskette or CD-ROM. In such instances, the messages are obtained from local sources rather than over the network 22. In yet another embodiment, the digital information can be resident in memory of the receiving system 18, i.e., not transferred over the network 10 or obtained from local media, and a process that attempts to access the digital information can trigger execution of the application software that provides the message protection of the invention.

Protecting Transmitted Messages

As described in more detail below, various processes of the invention, when applied individually or in combination, protect messages received by the receiving system 18 from unauthorized publication, replication, and distribution. Such processes, generally, (1) store the digital information representing the message in the memory 36' in a manner designed to conceal the message from unauthorized access, referred to as "secure storage," (2) restrict unauthorized use at the receiving system 18 of the message that is generated from the stored digital information, referred to as "copy-protection," and (3) remove traces of the message from the receiving system 18 upon completion of using the message, referred to as "automatic deletion."

Secure Storage

Secure storage of the invention makes the digital information stored in the memory 36' difficult to find by an unauthorized process, but if found, useless for reconstructing the message therefrom. First, the receiving system 18 can store the digital information at randomly determined address locations in the memory 36', rather than at contiguous address locations. Thus, an unauthorized process running on the receiving system cannot readily find the complete message just by finding one portion of the message. Secondly, the receiving system 18 can encode the digital information before storing the information in the memory 36.' Then should an unauthorized process find every portion of the message, that process may still not be able to reconstruct the message without a key to decode the encoded digital information. Notably, these measures for providing secure storage can be employed independently or in combination.

Copy Protection

Copy protection of the invention restricts electronic use by a user of the receiving system 18 of the generated message so as to protect against unwanted dissemination of the message. As described below, the user is unable to copy, modify, edit, save, capture in a cut-and-past buffer, or forward the message that is generated from the digital information stored in memory 36'. In one embodiment, use of the generated message is limited to audiovisual output, that is, simply displaying the message on the display screen 28' and playing sound on the local speaker 46'. In this regard, the user cannot electronically propagate the generated message beyond visually and audibly sensing the output at the receiving system 18. In another embodiment, use of the generated message further includes printing a copy of the message on the printer 24. In still another embodiment, the use is limited to storing the message on a CD-ROM.

Automatic Deletion

Contrary to the some expectations, digital information representing a message may remain on a computer system although a user has deleted the message or discontinued viewing a Web page. This result can be particularly troublesome if the message contains highly confidential or secretive information that the sender or receiver intended to permanently destroy. Automatic deletion of the invention, as describe further below, ensures that the message is actually destroyed at the receiving system 18 by irretrievably removing the digital information from the memory 36' after the user has terminated use of the message. In combination with the copy-protection feature of the invention, the automatic deletion feature also increases an assurance that the message cannot be disseminated beyond the receiving system 18.

Generally, the above-described processes of the invention are implemented in software installed on the receiving system 18. Software installed on the sending system 14 (or the server system 22) enables the sender of the message to selectably designate that message for copy protection and automatic deletion before sending the message. These protective measures can be selected independently or in combination, that is, the sender 14 or 22 can designate the message for copy protection without automatic deletion, automatic deletion without copy protection, or copy protection with automatic deletion. In one embodiment, the receiving system 18 can also designate the message for automatic deletion before or after the message has been received.

Figure 2:
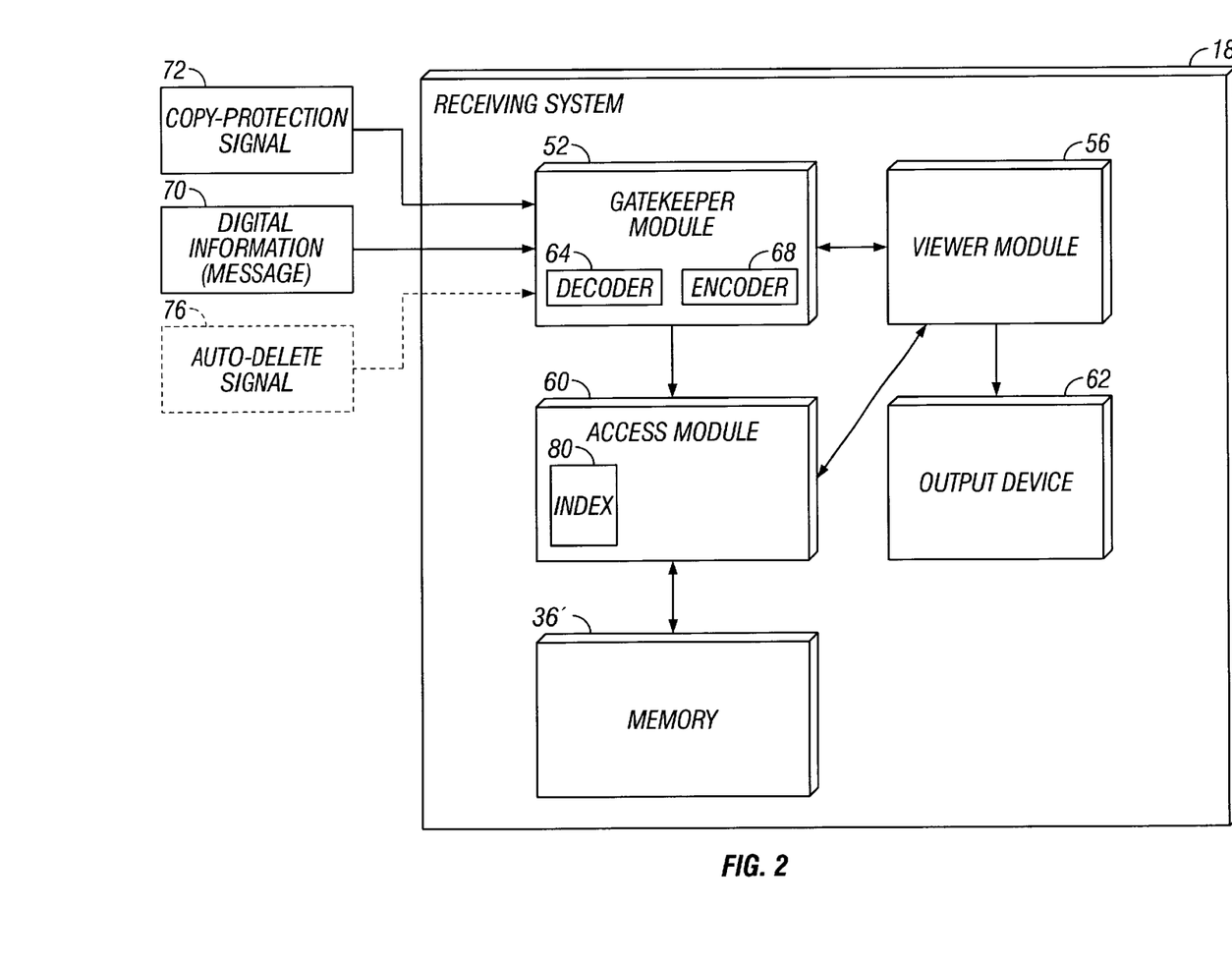
FIG. 2 is a diagram of an exemplary embodiment of software modules installed on the receiving system for providing protection to messages from unauthorized copying and dissemination according to the principles of the invention.

FIG. 2 shows a block diagram of exemplary software components of the software installed on the receiving system 18. The software components include a gatekeeper module 52 in communication with a viewer module 56 and an access module 60. The gatekeeper module 52 receives a message 70. The message 70 can be transmitted over the network 10 by the sending system 14 or the server system 22, obtained from CD-ROM or diskette, or from local memory 36'. A copy-protection signal 72 and/or an automatic deletion signal 76 may accompany the message 70. As described above, the copy protection and automatic deletion signals 72, 76 indicate whether the sender 14 or 22 has elected to copy-protect and automatically delete the message 70. The gatekeeper module 52 communicates with the access module 60 to store the digital information corresponding to the message 70 in the memory 36'. The access module 60 includes an index 80 for recording the physical storage locations (i.e., addresses) in the memory 36' of the digital information.

To secure the message 70 during transmission and make efficient use of resources, (e.g., network bandwidth, CD-ROM or diskette memory), the digital information representing the message 70 may be encoded and compressed when received at the receiving system 18. The gatekeeper module 52 includes a decoder 64 capable of decompressing and decoding the digital information to produce clear text. Clear text can be a stream of bits, a text file, bitmap, digitized voice, a digital image, etc., that typically requires further processing to generate the message 70. It will be appreciated by one skilled in the art that the decoder 64 has a key necessary for obtaining the clear text from the encoded and compressed digital information.

The viewer module 56 of the invention is an application program that can process the format of the clear text to generate the message 70. The viewer module 56 can provide viewing capability for a wide variety of formats by including one or more viewer modules and/or viewer applications for each format type. An example of a viewer application that can be included within the viewer module 56 is a program that displays images stored in a GIF format, a graphics file format used for transmitting raster images on the Internet. Some of the viewer modules and viewer applications incorporated within the viewer module 56 can be commercially-available viewer applications, such as Adobe Acrobat, which converts fully formatted documents from a variety of applications into a Portable Document Format (PDF) that can be viewed on various system platforms. Other commercially-available viewer applications can be a word processing program (e.g., Microsoft WORD™ and Microsoft EXCEL™).

Viewer application programs and viewer modules can be dynamically added to the viewer module 56. For example, in the instance where the format of the clear text requires a viewer application not currently available on the receiving system 18, the receiving system 18 can request and download that application from another system, where the application is known to reside, and add that application to the viewer module 56.

When generating audiovisual output corresponding to the message 70 on the output device 62, (e.g., the display screen 28'), the viewer module 56 communicates with the access module 60 to retrieve the clear text from the memory 36'. To secure the clear text while stored in the memory 36', the gatekeeper module 52 can encode the clear text using an encoder 68 and a key associated with the user of the receiving system 18. The viewer module 56 then controls the outputted message 70 as directed by the copy-protection 72 and automatic deletion signals 76.

Figure 3:
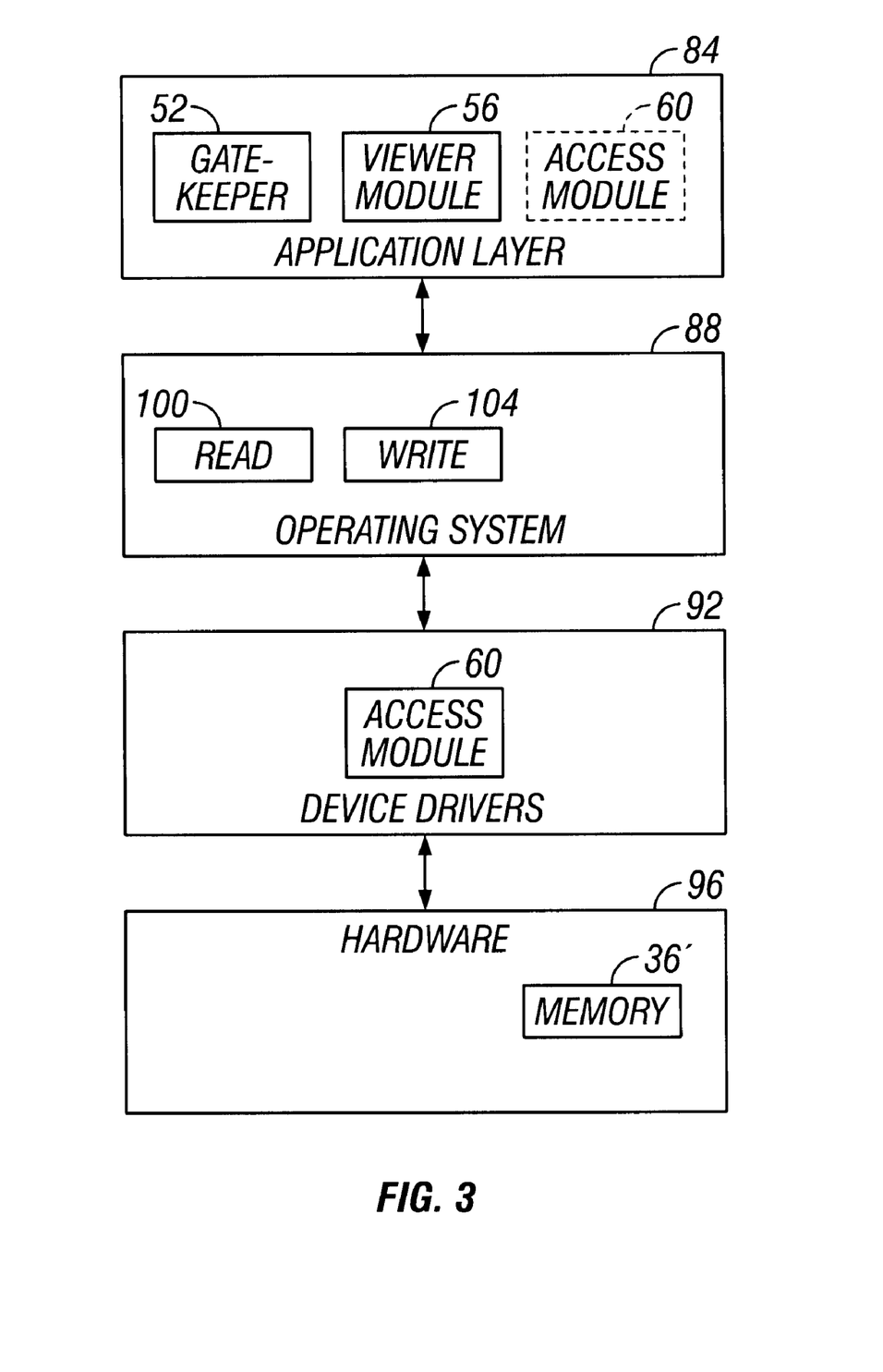
FIG. 3 is a diagram of an exemplary embodiment of layered software including the software modules of FIG. 2 installed on the receiving system.

FIG. 3 shows an exemplary organization of the software components 52, 56, 62 within the receiving system 18. The software organization includes an application layer 84, an operating system layer 88, and a device driver layer 92. The application layer 84 interfaces with the operating system layer 88. The operating system layer 88 includes the software procedures for controlling and using the hardware 96 of the receiving system 18. Two exemplary operating system procedures include a read operation 100 and a write operation 104. To control the hardware 96, the operating system layer 92 interfaces with the device driver layer 92. Device drivers communicate with the hardware 96 to transmit and receive digital information from the hardware 96.

The gatekeeper module 52 and the viewer module 56 are application programs at the application layer 84. The access module 60 is a device driver that cooperates with the operating system to provide direct access to the digital information stored in the memory 36'. In another embodiment, the access module 60 can be an application program at the application layer 84 that communicates with the hardware 96 through the operating system.

Figure 4:
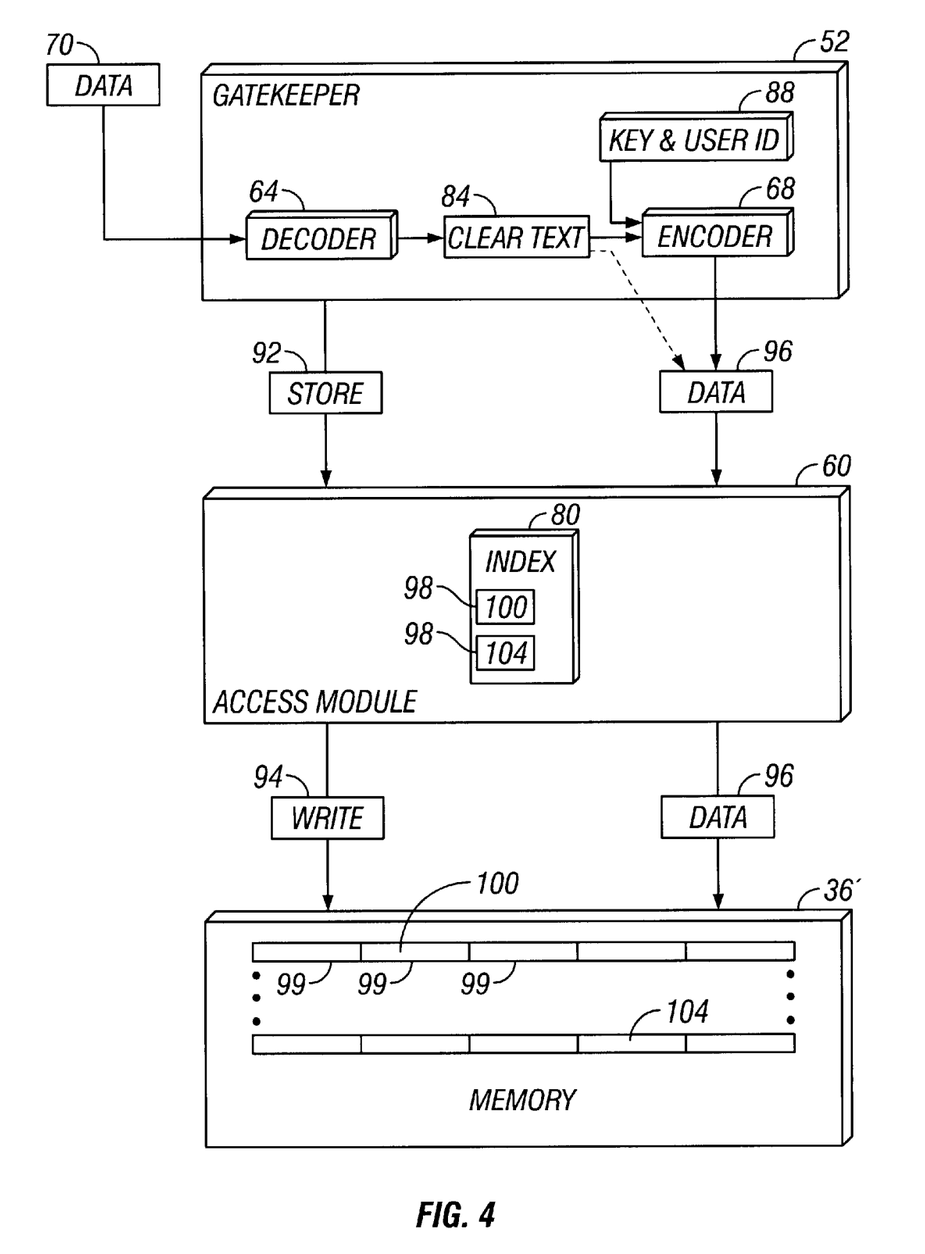
FIG. 4 is a flow diagram of an exemplary process by which the software modules store messages in a storage device.

FIG. 4 shows exemplary processes by which the client software on the receiving system 18 protectively stores the message 70 received over the network 10. In the event that the message 70 is compressed and encoded, the decoder 64 decompresses and decodes the digital information of the message 70, as appropriate, to produce clear text 84. If stored in the memory 36' as clear text 84, the message 70 may be intelligible to any process with access to the physical storage locations of the clear text 84. As described above, to reduce the likelihood of such access, the gatekeeper module 52 provides secure storage of the digital information by encoding the clear text 84, randomizing the physical storage locations of the digital information in the memory 36', or both, or by other methods used by one skilled in the art.

To encode the clear text 84, the encoder 68 uses an encryption algorithm and a key 88 associated with the user of the receiving system 18. The gatekeeper module 52 generates the key 88 when the user successfully logs onto the receiving system 18. Accordingly, any process that accesses the physical storage locations of the encoded information cannot generate the message 70 without the key 88. Although the digital information stored at those physical storage locations may be accessed, copied, and disseminated, the encoding of the digital information secures the message 70.

The gatekeeper module 52 then performs a write operation 92 through the operating system and forwards the digital information 96 to the access module 60. The access module 60 writes the digital information into the memory 36', storing the digital information at contiguous address locations 99 of the memory 36' or at randomly generated address locations (e.g., 100 and 104).

When the gatekeeper module 52 distributes the digital information at randomly determined address locations of the memory 36', only a process that obtains every portion of the digital information pertaining to the message 70 can reconstruct the complete message 70. The index 80 of the access module 60 maintains pointers 98 to the storage locations of each portion of the digital information. An authenticated process can access the index 80 to obtain every portion and properly reassemble the message 70 for output. To conceal the physical storage locations from unauthorized access, the pointers 98 themselves can be encoded. By encoding the pointers 98, any process without decoding capabilities that accesses the index 80 is still unable to decipher the storage locations at which to find the digital information.

Figure 5:
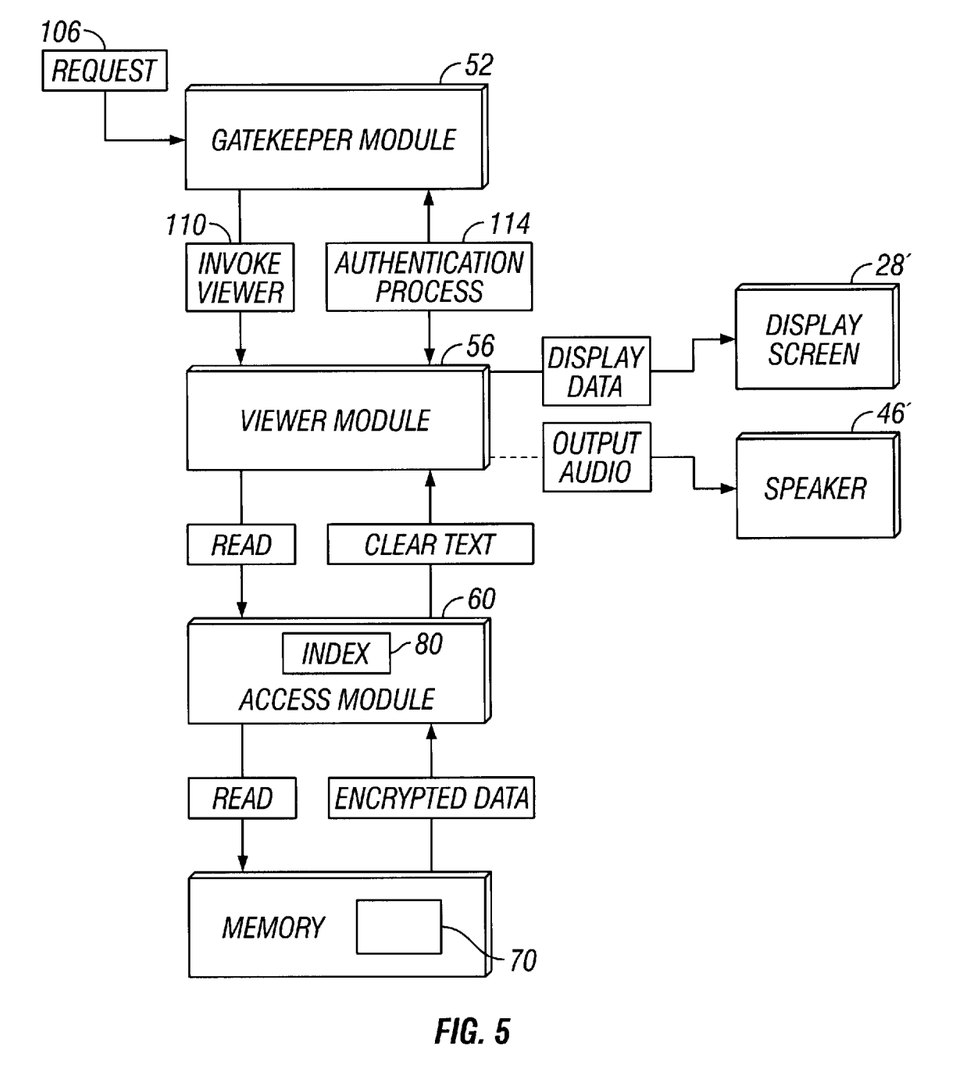
FIG. 5 is a flow diagram of an exemplary process by which the software modules read messages from the storage device.

FIG. 5 shows an exemplary process by which the message 70 is generated. When the receiving system 18 makes a request 106 to obtain the message 70, the gatekeeper module 52 verifies the validity of the request 106 and the authenticity of the requesting user. Upon verifying the request 106 and the user, the gatekeeper module 52 determines the appropriate viewer application program for outputting the message 70. The gatekeeper module 52 selects the appropriate viewer application according to the format of the digital information. In the event that more than one viewer application program within the viewer module 56 can be used to output the message 70, the gatekeeper module 52 chooses one of the viewer applications based upon a predetermined priority ranking among the viewer application programs. The gatekeeper module 52 invokes the viewer module 56 to start the appropriate viewer application program.

Upon invoking the viewer module 56, the gatekeeper module 52 and the viewer module 56 can engage in an authentication process 114 to ensure that the viewer application program is authorized to output the message 70. The gatekeeper module 52 sends encoded, randomly generated text to the viewer module 56. Only an authentic viewer module 56 can return the correct clear text corresponding the encoded text. An unauthorized process, then, running on the receiving system 18 in an attempt to supplant the viewer module 56 and capture the message 70, cannot generate the message 70 without first passing this authentication process 114.

If the gatekeeper module 56 receives clear text from the viewer module 56 that correctly corresponds to the encoded text, the gatekeeper module 52 then generates a session key and a process identification. The gatekeeper module 52 sends the session key to the viewer module 56, and the viewer module 56 uses the session key in all subsequent communications with the gatekeeper module 52. For all such communications, the gatekeeper module 52 verifies the session key and the process identification.

Upon authenticating the viewer module 56, the gatekeeper module 52 subsequently invokes the access module 60, providing the access module 60 with the necessary information about the selected viewer application program. The viewer module 56 is then able to access the message 70, although no other processes are able.

When the user of the receiving system wants to output the message 70, the viewer module 56 executes read operations 100 of the operating system, and the operating system communicates with the access module 60. In one embodiment, the read operations are designed to decode the encoded digital information after reading the encoded digital information from the memory 36'. Another viewer application program that reads the memory 36 using standard read operations, rather than the particular read operation of the invention, may access correct storage locations in the memory 36', but obtains encoded information only.

In response to the read operations, the access module 60 obtains and passes the digital information to the viewer module 56. The viewer module 56 then generates the message 70 from the digital information and outputs the message 70 at the receiving system 18. This output can be a display on the display screen 28', sound at the speaker 46', or both.

To prevent the receiving system user from producing or distributing unauthorized copies of the message 70, the viewer module 56 provides minimal functionality to the receiving system user while displaying the message 70 (hereafter, displaying includes producing sound). Once the viewer module 56 displays the message 70, the user of the receiving system 18 has limited control of that message 70. The user is unable to electronically replicate any portion of the message displayed on the screen 28'. Further, the viewer module 56 does not provide capabilities typically available in standard viewer applications, such as saving the message in a file, forwarding the message to another device (e.g., a fax machine, printer, etc.) or computer system, modifying the displayed message, or capturing a portion of the displayed message into a buffer (i.e., cut-and-paste). To withhold printing capabilities from the user, the viewer module 56 can redefine the keys on the keyboard 32' so that none of the keys provide "print-screen" functionality. Consequently, the receiving system user is limited to viewing (or listening to) the message and terminating such viewing.

In another embodiment, the viewer module 56 permits the user to send the message 70 to the printer 24. Because the viewer module 56 prevents the user from modifying the message 70, the hard-copy print-out is an exact version of the generated message 70. An advantage is that system users can exchange documents with an assurance that such documents cannot be modified easily. The viewer module 56 can also restrict the number of printed copies to a predetermined limit. Still, the ability to print out the message enables the user to produce unauthorized copies of the message, for example, by using scanner and copier technologies.

The viewer module 56 can also operate to prevent other processes from running on the receiving system 18 that can capture the message 70 while the message 70 is being displayed. Such processes may originate at the receiving system 18 or from a remote system attempting to communicate with the receiving system 18. To restrict the receiving system user from executing other processes at the receiving system 18, the viewer module 56 displays the message on top of all other graphical windows or displays on the display screen 28'. The viewer module 56 can also maximize the displayed message to fill the display screen 28'. Also, the user cannot minimize this display. Consequently, the displayed message covers all other desktop icons and windows, effectively blocking the user from launching or resuming execution of any application program represented by those icons and windows.

To prevent remote attempts to capture the displayed message, the viewer module 56 obtains a status of those processes being run on the receiving system 18 and monitors the receiving system 18 for any new processes or changes in existing processes while displaying the message 70. If the viewer module 56 detects a change in processes at the receiving system 18, the viewer module immediately terminates outputting the message 70. Termination can occur without regard to the character of the new process (i.e., the new process may or may not be trying to capture the message 70). Thus, processes that might produce a window that covers the displayed message 70, such as, a network disconnect message, for example, will cause the display to terminate, rather than to become a sub-level window.

In other embodiments, the viewer module 56 uses the character of the new process or change in process to determine whether to terminate outputting the message 70. For example, the viewer module 56 can look for specific processes and process changes, for example, a launch of a new process at the receiving system 18 or an attempt by a process to take the foreground, that is, to become active for receipt of local input from either the mouse or the keyboard. Detecting such processes can cause the message 70 output to terminate, but the viewer module can allow the message 70 output to continue when other generally trusted processes or process changes occur, such as receipt and notification of a new electronic mail message.

Automatic Deletion

As described above, the sending system 14 or receiving system 18 can designate the message 70 for deletion to ensure that all traces of the message disappear from the receiving system 18 when the receiving system 18 indicates an intention to terminate outputting the message 70. The user may be warned that terminating the viewing of the content permanently and irretrievably deletes the message 70. When the viewer confirms the intent to complete the viewing, a graphic sequence can give the viewer an impression that the message is being destroyed. The displayed image breaks up into smaller and smaller fragments. Further, the digital information stored in the memory 36' is permanently and irretrievably deleted by writing data bit values of zero to those storage locations containing the digital information.

In other exemplary embodiments, the generated message can be music or software that is output to a CD-ROM writer. Subsequent to successfully writing a CD-ROM with the music or software, the corresponding digital information on the system 18 can be deleted in accordance with the automatic deletion feature. Consequently, one copy only of the music or software is made. Further, the automatic deletion can be designed to allow more than one copy.

To implement automatic deletion, the access module 60 can maintain a status for the message 70 indicating whether the receiving system 18 has generated the message 70. The viewer module 56 generates the message 70 if the status indicates that the message has not yet been output. If the status indicates that the message 70 has been generated, the viewer module 56 does not generate the message again.

The status serves to thwart attempts to circumvent the automatic deletion feature. For example, a process can copy the digital information stored in the memory 36' and store the copy elsewhere. Then when the viewer module 56 generates the message 70, the status changes to record that the message 70 has been generated. Bit values of zero are subsequently written to the storage locations where the digital information was stored when viewing the message 70 has ended. The unauthorized process can use the copy to write the digital information back into zeroed storage locations and attempt to view the message 70 again. The status, however, shows that the message 70 has already been generated, and therefore the message 70 is not redisplayed. Further, the viewer module 56 can then direct the access module 60 to write zero bit values at those storage locations again.

It can be seen from the foregoing that the principles of the invention can be applied to a wide variety of practical applications. One such application enabled by the invention, for example, is a process for managing installations and monitoring usage of software products. Software of the invention that is installed on each receiving system in the network 10 can be adapted to prevent users from (1) installing on more computer systems than permitted by license or (2) executing the software in excess of license.

To implement an exemplary system for managing software installation and monitoring software usage, a database is used to maintain user information, e.g., a list of receiving systems subscribing to a particular software product offered by a distributor, here sending system 14. A distinction can be made between subscribers who are end users of the software product and subscribers who are resellers of the software product. For end users, the database can also include usage information such as a limit to the number of computer systems upon which the software product can be installed, a limit to the number of computer systems upon which the software product can concurrently execute, and a current count of the number of computer systems upon which the software is concurrently executing. For resellers, the database can maintain a limit to the number of computer systems to which the software product may be distributed and a count of the current number of distributed copies.

Such a database can be maintained, for example, in the storage device 48 of the server 22 and be accessible over the network 10 by the gatekeeper module 52 of each subscribing receiving system. The gatekeeper module 52 communicates with the database to update counts of the number of systems currently executing the software or of the current number of distributed copies.

The sending system 14 distributes the software product to each subscriber of the software product. Such distribution can be controlled by the limit and count values stored on the database (i.e., the limit to number of computer systems to which the software product may be distributed and the count of the current number of distributed copies).

Each subscriber also receives software, e.g., a DLL procedure (dynamic link library), that provides an interface between the software product and an installation program described below. When a particular end user subscriber for example, here receiving system 18, receives the software product (i.e., the message), the software product is stored in the memory 36' as described above. When the user of the receiving system 18 attempts to install the software product on the system 18, the gatekeeper module 52 controls whether that installation occurs by accessing the database, validating the receiving system user as a valid subscriber, and ensuring that the number of installations for that software product does not exceed the limit specified in the database.

For the purpose of installing the software product on the receiving system, the viewer module 56 includes a viewer application that operates as an installation program. To install the software product, the viewer module 56 authenticates with the gatekeeper module 56, as described above, and determines whether the installation program is permitted to install the software on the receiving system 18. Upon an authorization by the gatekeeper module 52, the installation program can then install the software product on the receiving system.

Another DLL on the receiving system 18 provides an interface between the installed software and the gatekeeper module 52. When the receiving system user attempts to execute the installed software, this DLL is invoked, prompting the gatekeeper module 52 to access the database and determine whether the software is permitted to execute. If the gatekeeper module 52 determines that this current attempt to execute the program would exceed the limit of the permitted number of concurrent users, then the gatekeeper module 52 can prevent the software from running. Thus, the principles of the invention manage the installation and usage of the software product so as to meet the requirements specified in the database.

For the purpose of distributing software product (e.g., by the sending system 14), the viewer module 56 of the sending system 14 includes a viewer application that operates to transmit the software product to a target receiving system. As described above, the viewer module 56 authenticates with the gatekeeper module 56, and the gatekeeper module 52 accesses the pertinent information on the database before such distribution is permitted. Upon transmitting the software product, the gatekeeper module 52 communicates with the database to update the count of distributed copies.

While the invention has been shown and described with reference to specific preferred embodiments, it should be understood by those skilled in the art that various changes in form and detail may be made therein without departing from the spirit and scope of the invention as defined by the following claims.

What is claimed is:

1. A method for providing protection from unauthorized use of messages received by a system, comprising the steps of:
   receiving at the system digital information representing a message;
   storing the digital information in a storage device in a manner designed to conceal the message from unauthorized access;
   accessing the digital information stored in the storage device;
   generating the message from the stored digital information at the system; and
   restricting use of the generated message.

2. The method of claim 1 wherein the step of restricting limits use of the generated message to outputting the generated message at the system and printing a copy of the generated message.

3. The method of claim 2 further comprising the step of limiting printed copies of the message to one copy.

4. The method of claim 1 wherein the step of restricting limits use of the generated message to outputting the generated message at the system.

5. The method of claim 1 further comprising the step of encoding the digital information before storing the digital information in the storage device.

6. The method of claim 1 wherein the step of storing the digital information includes distributing the digital information at randomly determined address locations of the storage device.

7. The method of claim 1 further comprising the steps of:
   outputting the message at the system;
   monitoring the system for process changes that occur on the system while the message is being output at the system; and
   terminating the outputting of the message at the system when a process change is detected.

8. The method of claim 1 further comprising the steps of:
   outputting a display of the generated message on a display screen of the system; and
   maximizing the display to fill the display screen and completely cover all other graphical images displayed on the display screen.

9. The method of claim 1 further comprising the steps of:
   executing an application program for outputting the message at the system; and
   successfully authenticating the application program before outputting the message at the system.

10. The method of claim 1 further comprising the steps of:
    outputting the generated message at the system; and
    deleting the digital information from the storage device when a user of the system indicates an intention to terminate outputting the generated message.

11. The method of claim 1 further comprising the step of electronically designating the digital information for deletion.

12. The method of claim 11 wherein the system is a receiving system and the step of electronically designating for deletion is performed by another system sending the digital information to the receiving system.

13. The method of claim 11 wherein the step of electronically designating for deletion is performed at the system.

14. The method of claim 1 further comprising the step of electronically designating the digital information for copy protection.

15. The method of claim 1 further comprising the step of outputting the generated message to an audio output device.

16. The method of claim 1 further comprising the step of outputting the generated message to a CD-ROM writer.

17. The method of claim 16 further comprising the step of deleting the digital information from the storage device after outputting the generated message to the CD-ROM writer.

18. A computer system for providing protection from unauthorized use of digital information representing a message, comprising:

a storage device;

a processor storing the digital information in the storage device in a manner designed to conceal the message from unauthorized access;

a message generator accessing the digital information stored in the storage device to generate the message from the stored digital information at the system but restricting use of the generated message.

19. The computer system of claim 18, further comprising:

an output device in communication with the message generator, and wherein the message generator limits use of the generated message to outputting the generated message at the output device.

20. The computer system of claim 18, wherein the output device is a CD-ROM writer for programming CD-ROMs with the generated message.

21. The computer system of claim 18 further comprising:

an output device in communication with the message generator, and wherein the message generator limits use of the generated message to outputting the generated message at the output device and at a printing device.

22. The computer system of claim 18 further comprising:

a process monitor monitoring the computer system for process change that occur on the computer system while the message is being output at the output device, and terminating the outputting of the message at the system upon detecting a process change.

23. The computer system of claim 18 further comprising:

an encoder providing the manner designed to conceal the message from unauthorized access by encoding the digital information before the processor stores the digital information in the storage device.

24. The computer system of claim 18 wherein the processor provides the manner designed to conceal the message from unauthorized access by storing the digital information at randomly determined address locations of the storage device.

* * * * *